(No Model.) 2 Sheets—Sheet 1.
J. H. PALMER.
SECONDARY BATTERY.
No. 462,449. Patented Nov. 3, 1891.
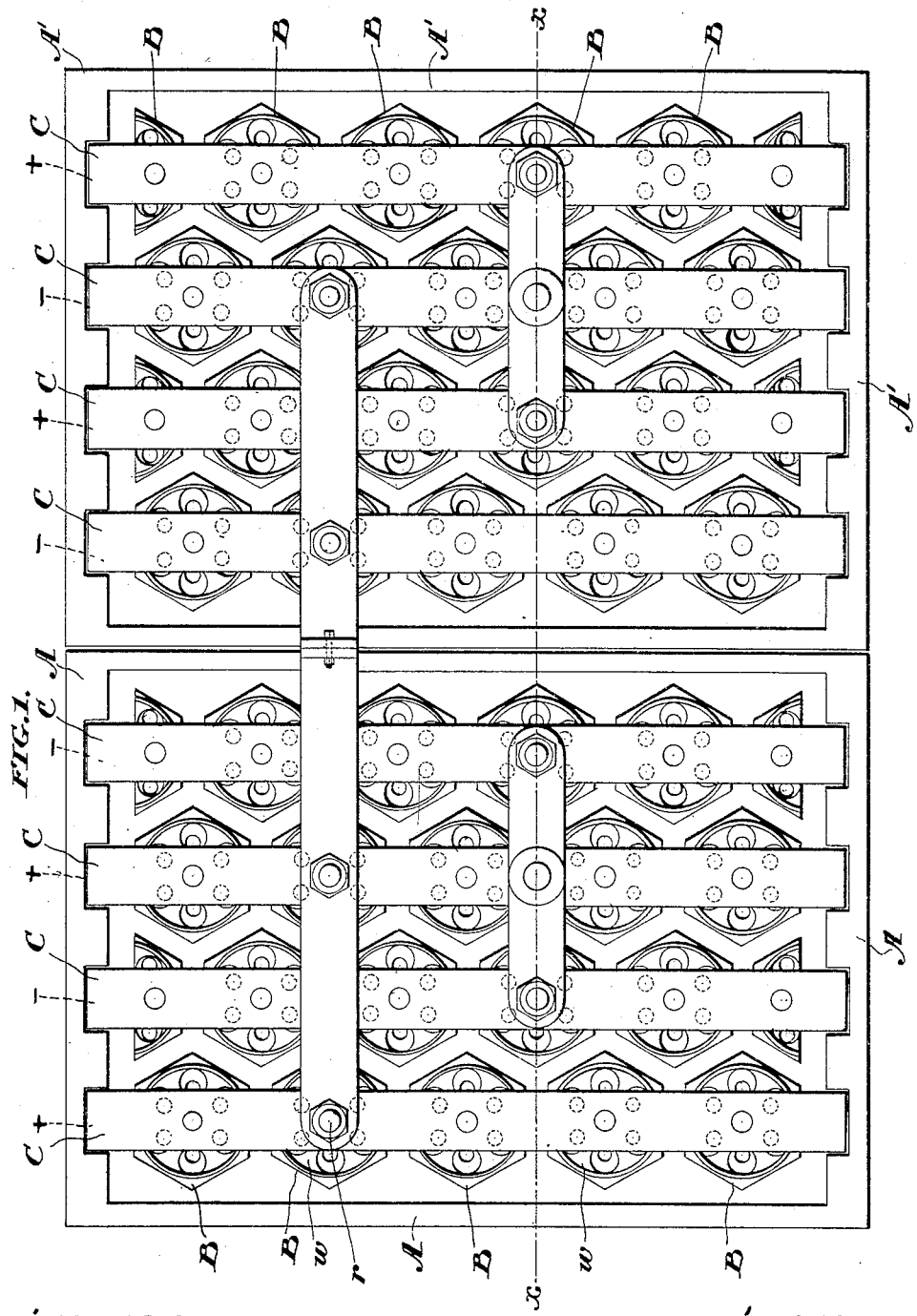
WITNESSES:
Wm. A. Pike
Geo. A. Van Dusen
INVENTOR:
John H. Palmer,
By his Attorney
H. Wall Pettit.

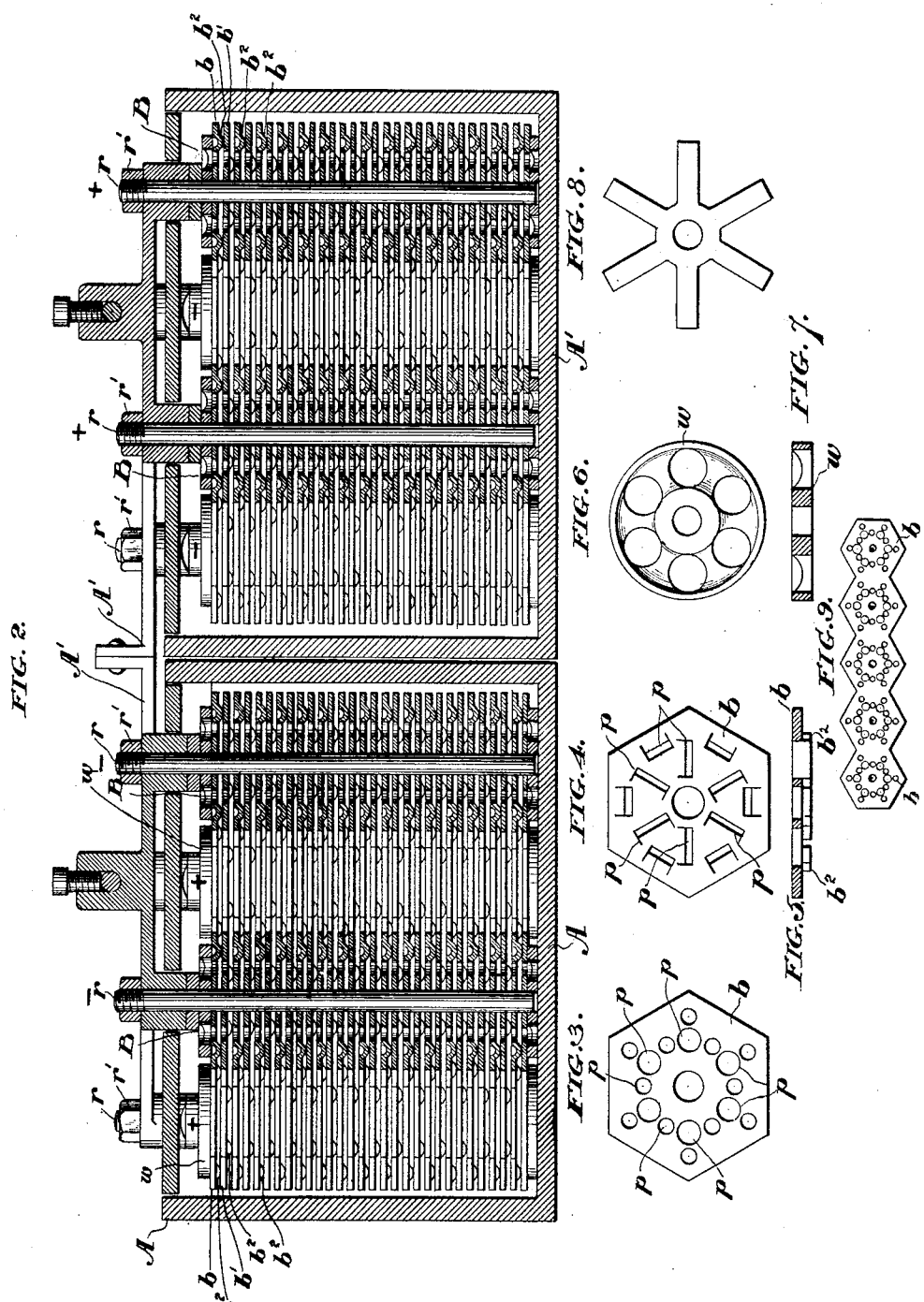

UNITED STATES PATENT OFFICE.

JOHN H. PALMER, OF BOSTON, MASSACHUSETTS.

SECONDARY BATTERY.

SPECIFICATION forming part of Letters Patent No. 462,449, dated November 3, 1891.

Application filed January 3, 1891. Serial No. 376,625. (No model.)

*To all whom it may concern:*

Be it known that I, JOHN H. PALMER, of the city of Boston, and State of Massachusetts, have invented a certain new and useful Improvement in Storage-Batteries; and I do hereby declare the following to be a full, clear, and exact description thereof, reference being had to the accompanying drawings, forming part of this specification.

My invention has relation to secondary batteries; and it consists in the construction hereinafter particularly described.

The object of my invention is to provide a battery in which the greatest amount of lead surfaces is presented with the least weight and in a small compass; also, to provide rigidity of the construction of the plate or electrode and to provide a construction which will facilitate the free circulation of the electrolyte on and about the lead surfaces. A further object is to provide a plate or electrode of a construction that will readily retain the active material on the lead surfaces.

In the accompanying drawings similar letters of reference refer to similar parts throughout.

Figure 1 is a plan view of my improved storage-battery, showing two cells connected. Fig. 2 is a sectional view on the line $x\,x$ of Fig. 1. Fig. 3 is a plan view of one of the plates composing the laminated pillars. Fig. 4 is a similar view of one of the plates, showing elongated orifices or perforations. Fig. 5 is a sectional view of the plate shown in Fig. 4. Fig. 6 is a plan view of the washer, preferably provided on the top and bottom of the laminated pillars. Fig. 7 is a sectional view of the washer shown in Fig. 6. Fig. 8 represents a substitute form of interposing washer or material between the laminated plates. Fig. 9 shows one continuous form of laminated plate of the electrode as a substitute for the several divided pillars.

A A' represent the jars or casings into which the cells or elements are set, which said jars or casings contain the electrolyte fluid.

B represents the laminated pillars connected together in a series by metal strips C, which add rigidity to the construction and serve as conductors. Each of a series of pillars connected by a single plate C form what is generally termed the "plate" or "electrode."

The pillars B are built up and composed of numerous thin horizontal pieces of lead $b\,b'$, preferably hexagonal in shape. The pieces $b\,b'$ are preferably constructed with a number of projections $b^2$ on one or both sides, which may be formed with a punch or die. These projections $b^2$ are located on a different part of the plate from those on each of the adjoining plates and serve to keep the plates $b\,b'$ slightly separated to admit of the free access and contact of the electrolyte with the surface of each of the said plates. To allow of a free circulation of the electrolyte fluid small holes $p$ are provided in the plates $b\,b'$. A suitable number of these plates or pieces $b\,b'$ are provided, one above the other, and held firmly together in position by a rod $r$ passing through a hole in the center of each of the plates $b\,b'$ and secured together by a nut $r'$ or by other suitable means. A washer $w$, of brass or copper, is placed at the top and bottom of each pillar B, provided with orifices or holes through which the electrolyte fluid can pass. The rod $r$ is preferably constructed of brass coated with lead. Any desirable number of plates or pieces $b\,b'$ may be employed in the pillar B, and any desirable number of pillars may constitute a plate or electrode connected together by the conducting-plate C. The desired number of plates having been provided, consisting of a desirable number of pillars B, they are arranged and provided in the jars A or A' in positive and negative groups, as shown, and the positive electrodes or plates of the one cell are connected with the negative plates or electrodes of the other cell in the usual manner, and the current-conducting wires are attached to the cells by any desired means.

In the construction shown of hexagonal pillars B the greatest economy of space is obtained, though I do not limit myself to this particular form of construction.

The thin lead pieces or plates $b\,b'$ can be varied in configuration, being rounded, square, triangular, or of any polygon figure; but I prefer the hexagonal shape on account of the economy of space afforded thereby.

The pieces or plates $b\ b'$ may be of any desirable thickness, and in practice can be made extremely thin, if desired, as they are mutually supported by the projections formed upon them.

Although, as shown in the drawings, there is no material placed between the thin pieces or plates $b\ b'$, I do not limit myself in that respect, as various materials may be interposed between the lead surfaces of the said plates without departing from my invention. In place of the projections $b^2$, formed on the pieces or plates $b\ b'$, independent interposing pieces or parts of lead or other suitable material may be provided between the plates $b\ b'$—for instance, of such a construction as shown in Fig. 8, provided with radiating arms.

The lead pieces or plates $b\ b'$, forming the laminated pillars B, may be, if desired, constructed in one continuous strip, as shown in Fig. 9, to form a plate or electrode without being subdivided into numerous smaller pillars, as previously described, though the pillar construction is a more desirable form, as it allows of a freer circulation of the electrolyte fluid and brings it into contact with more extended lead surfaces.

The cell construction of a storage-battery, as shown and described, combines the essential features of a secondary element in a compact form which can be readily constructed of any capacity.

Having thus described my invention, what I claim, and desire to secure by Letters Patent, is—

1. In a storage or secondary battery, a plate or electrode formed of laminated pillars connected to each other by metallic bars.

2. In a storage or secondary battery, a plate formed of laminated pillars connected to each other by metallic bars, the said pillars composed of thin pieces of lead or other material separated and kept apart by interposing parts or projections.

3. In a storage or secondary battery, a plate formed of laminated pillars connected to each other by metallic bars, said pillars composed of thin pieces of lead or other material separated and kept apart by projections formed on one or both sides thereof, consisting of part of the same pieces of metal of which the thin pieces or plates are composed.

4. In a storage or secondary battery, a laminated plate or electrode composed of thin horizontal pieces of lead or other suitable material separated and kept apart from each other by interposing parts or projections secured together by vertical rods or other suitable means, substantially as described.

5. In a storage or secondary battery, a plate formed of laminated pillars connected to each other by metallic bars, said pillars formed of a number of thin pieces of lead or other material polygon in shape.

6. In a storage or secondary battery, a plate formed of laminated pillars connected to each other by metallic bars, the thin pieces of which the pillars are constructed having perforations to allow of the free passage of the electrolyte.

7. In a storage-battery, a plate formed of laminated pillars connected to each other by metallic bars, in which the several plates of an element are arranged so that their respective angles fit into each other, substantially as described.

8. A storage-battery composed of a jar A for containing the electrolyte fluid, laminated pillars B, composed of numerous thin horizontal lead pieces or plates $b\ b'$, having projections $b^2$ and orifices $p$, vertical securing-rod $r$, and connecting-plates C, connecting said pillars B in series, said positive and negative plates being connected substantially as described.

In witness whereof I have hereunto set my hand this 22d day of December, A. D. 1890.

JOHN H. PALMER.

Witnesses:
LEONARD A. WHITNEY,
WM. U. SWAN.